(12) United States Patent
Meyer et al.

(10) Patent No.: US 8,127,573 B2
(45) Date of Patent: Mar. 6, 2012

(54) MOLD COOLING SYSTEM FOR I.S. MACHINE

(75) Inventors: Willi Meyer, Effretikon (CH); Thomas Müller, Buochs (CH)

(73) Assignee: Emhart Glass S.A., Cham (CH)

( * ) Notice: Subject to any disclaimer, the term of this patent is extended or adjusted under 35 U.S.C. 154(b) by 1100 days.

(21) Appl. No.: 11/398,261

(22) Filed: Apr. 4, 2006

(65) Prior Publication Data

US 2007/0227192 A1   Oct. 4, 2007

(51) Int. Cl.
*C03B 9/38* (2006.01)
(52) U.S. Cl. ................. 65/356; 65/265; 65/355
(58) Field of Classification Search .............. 65/355, 65/356, 227, 243, 261, 265
See application file for complete search history.

(56) References Cited

U.S. PATENT DOCUMENTS

| 3,133,807 A | | 5/1964 | Denman et al. | |
| 3,849,101 A | * | 11/1974 | Wythe et al. | 65/355 |
| 4,251,253 A | * | 2/1981 | Becker et al. | 65/267 |
| 4,668,269 A | * | 5/1987 | Cantu-Garcia et al. | 65/68 |
| 2004/0211220 A1 | * | 10/2004 | Meyer et al. | 65/356 |

FOREIGN PATENT DOCUMENTS

| DE | 3239095 | 4/1984 |
| EP | 102820 | 3/1984 |
| EP | 0576745 | 1/1994 |
| EP | 1637505 | 3/2006 |
| GB | 1337292 | 11/1973 |
| GB | 2256868 A | 12/1992 |
| WO | 9739989 | 10/1997 |

* cited by examiner

*Primary Examiner* — Matthew Daniels
*Assistant Examiner* — Cynthia Szewczyk
(74) *Attorney, Agent, or Firm* — Reinhart Boerner Van Deuren s.c.

(57) ABSTRACT

A mold cooling system for an I.S. machine wherein cooling air is supplied to vertical cooling holes defined in the molds either at their ends or midway along their length.

13 Claims, 6 Drawing Sheets

MOLD COOLING SYSTEM FOR I.S. MACHINE

This invention relates to the cooling of molds at a blow station of an I.S. type glassware forming machine.

BACKGROUND OF THE INVENTION

In the production of glass containers in an I.S. type machine, glass is formed a gob of glass is delivered to a blank or parison mold comprising two mold members which are supported by a mold open and close mechanism (the blank station of the machine). The glass in the mold cavity may be formed into a parison by a plunger moving upwardly into the mold cavity (a lower portion of the glass is forced into a neck ring of the mold to form the finish of the final bottle). The plunger is then withdrawn and the parison, held at the finish, is carried away from the blank station to a blow station where it is blown to the required shape in the cavity of a blow mold.

It is necessary to cool the blank and blow molds, and this is commonly done by providing the mold members with cooling passages extending vertically therethrough from a lower end face to an upper end face of the mold member, as shown in EP 102820, and providing cooling air (either from the top or from the bottom) to these passages from a plenum chamber when the molds are closed. This method of cooling the mold has several advantages, one of which is that it is possible to calculate the cooling effect of given air pressure and given cooling passage dimensions.

Instead of supplying cooling air to the top or bottom of these cooling holes, EP patent specification number 0 576 745, discloses a system for supplying cooling air to these cooling holes at a location between the top and bottom of the holes so that cooling air will travel upwardly and downwardly through these holes from this inlet.

OBJECT OF THE INVENTION

It is an object of the present invention to provide improved cooling of a blow mold in a glassware making machine.

Other objects and advantages of the present invention will become apparent from the following portion of the specification and from the accompanying drawings which illustrate, in accordance with the mandate of the patent statutes, a presently preferred embodiment incorporating the principles of the invention.

DETAILED DESCRIPTION OF THE PREFERRED EMBODIMENT

Figure 1:
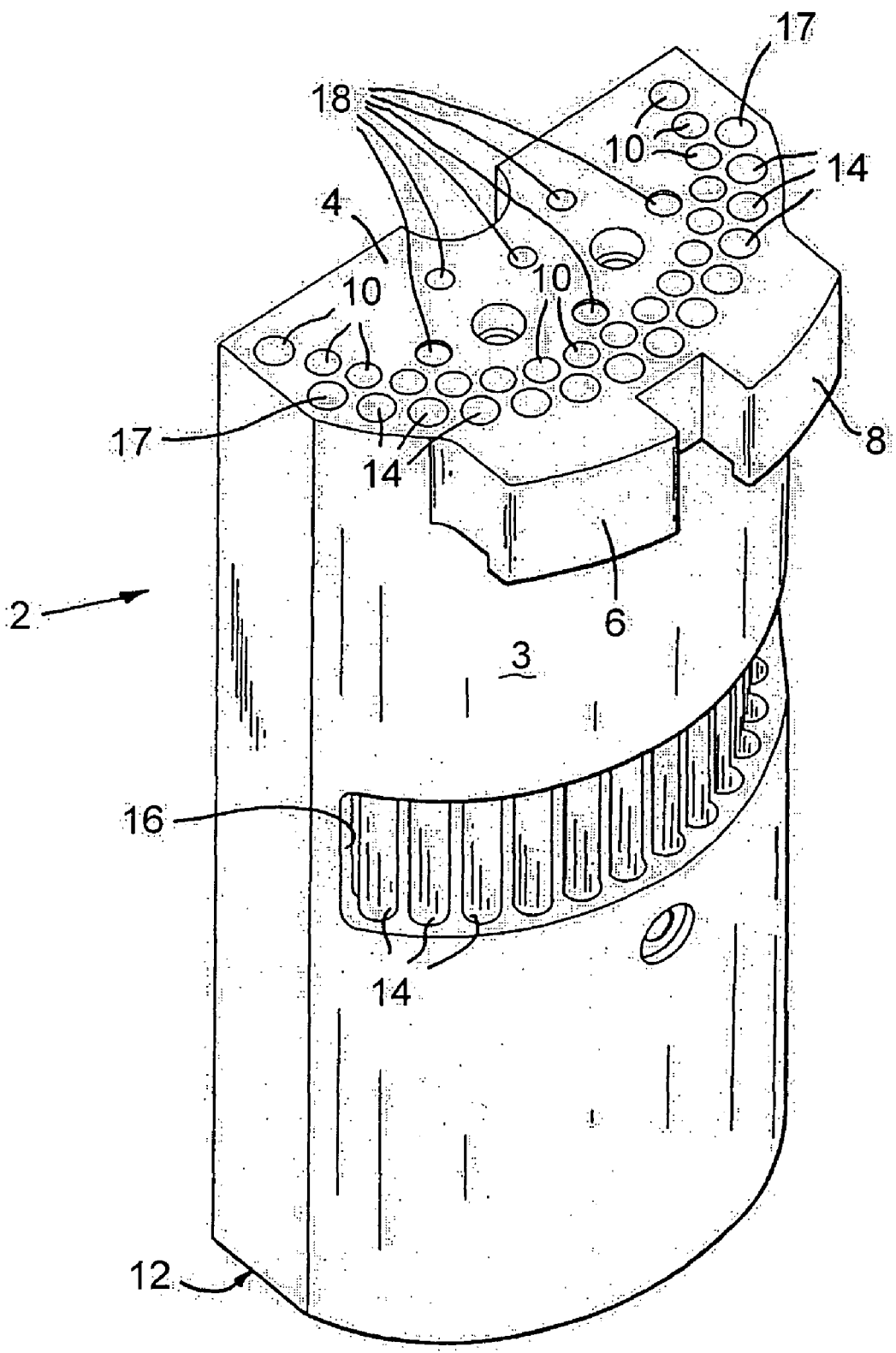
FIG. 1 shows a view of a mold member of a blow mold used in an I.S. machine embodying the invention.

An I. S. machine forms a gob of molten glass into a parison at a blank station and delivers the formed parison to a blow station where it will be enclosed (from the finish down) by two opposed blow mold halves 2 (FIG. 1) and a mold bottom 54 (FIG. 2) which is captured by the closed mold halves. Each mold member 2 is generally half cylindrical in shape and comprises a generally cylindrical outer surface 3, a mold recess 5 (FIG. 2) and a top surface 4 adjacent to which are two flanged lugs 6, 8, by which the mold member can be supported in the mold mechanism. The mold member 2 comprises a first, inner, generally circular array of straight cooling passages 10 which extend vertically through the mold member from its top face 4 to its flat bottom face 12. The mold member also comprises a second, outer, circular array of straight cooling passages 14 extending vertically through the mold member, proximate to the outer cylindrical surface of the mold, from its top face 4 to its bottom face 12. The mold member also comprises, as desired for the achievement of the desired cooling, further cooling passages, for example passages 17, which may be extensions of the second array located proximate the end of the circular outer surface in the region of the flat mold sides 13. Passages 18, which are inward of the first array, are provided to supply vacuum to the mold when needed. Formed in the outer surface 3, about half way up the cylindrical surface portion, is a recess 16 which extends horizontally, circumferentially round the cylindrical portion of the mold member 2 and is of a depth such that it extends across half the width of each of the passages 14 of the second array and thus opens directly into the passages 14.

Figure 2:
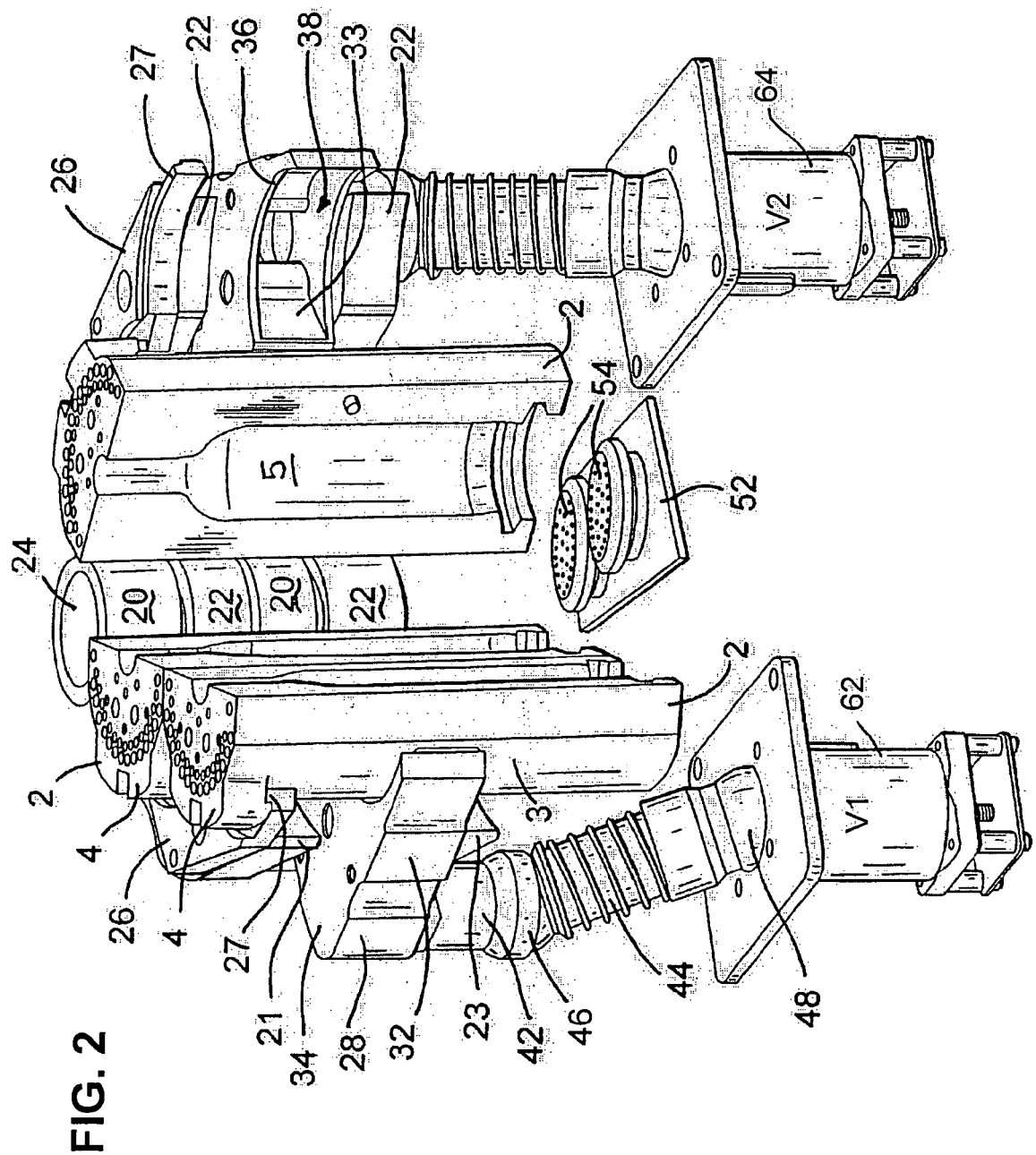
FIG. 2 shows a somewhat schematic perspective view of a mold mechanism.
Figure 3:
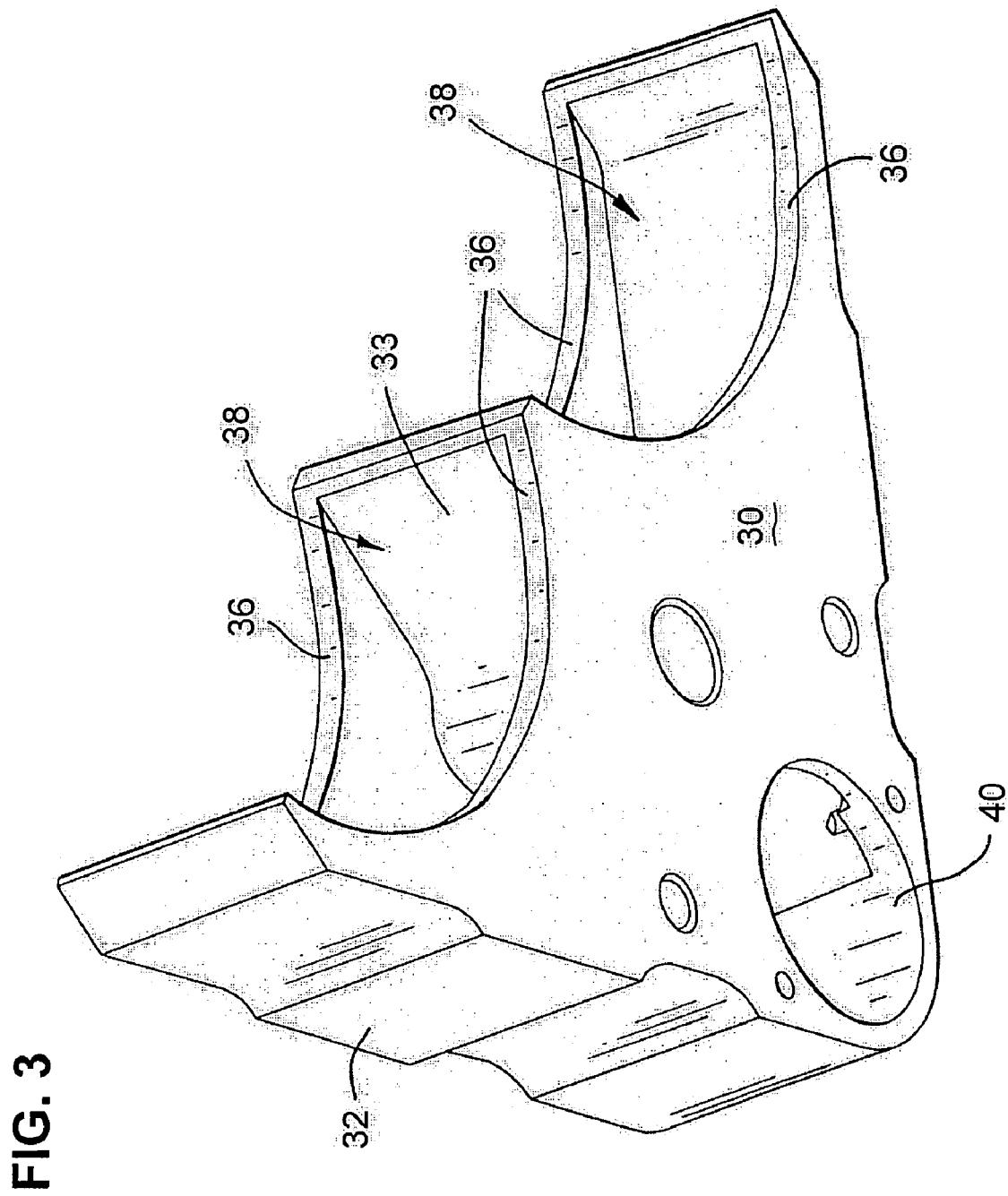
FIG. 3 shows a cooling air chamber viewed from below.

FIG. 2 shows a mold mechanism at a blow station of a double gob glass bottle making machine. The mold mechanism comprises a pair of arms 20, 22, which are mounted on a vertical shaft 24 fixed to a table of the machine (not shown). These arms can be moved between an open position, as shown in FIG. 2, and a closed position by well known mechanism, not shown. The mold arm 20 will be described in detail, and it will be realized that the construction of the arm 22 is generally similar. The mold arm 20 comprises an upper extension 21 and a lower extension 23. The upper extension 21 supports a hanger member 26 having two mold supporting ridges 27 which are adapted to support two mold members 2 by engagement of the flanged lugs 6, 8, over the ridges 27. Below the hanger member 26, the lower extension 23 of the arm 20 supports an air supply chamber 28. This chamber 28 (FIG. 3) is formed by a base wall 30, a v-shaped side wall 32, a reinforcing internal wall 33 and a top wall 34. That part of the chamber 28 which faces the mold members 2 is provided with curved surfaces 36 which bound openings 38 and are adapted to engage around the outer surfaces 3 of the two mold members around the boundaries of the recesses 16. Formed in the base wall 30 is an opening 40 which is connected by way of tubes 42 and 44 and swivel joints 46 and 48 to a control cylinder V1, V2 which is connected to a supply of cooling air under pressure. The cylinders V1, V2 are secured to a table of the machine (not shown). It will be seen that the cylinders V1, V2 supply cooling air to the chambers 28 on both sides of the machine.

A base plate 52 is secured to the table of the machine and comprises a pattern of upwardly facing outlets 54 which correspond to the pattern of the lower ends of the cooling passages 10, 14, 17 and 18 of the mold members when the mold members are in their closed position. Air is supplied to the outlets 54 at uniform pressure from a Base Plate Plenum Chamber 55 (FIG. 7) fixed below the plate 52.

Figure 7:
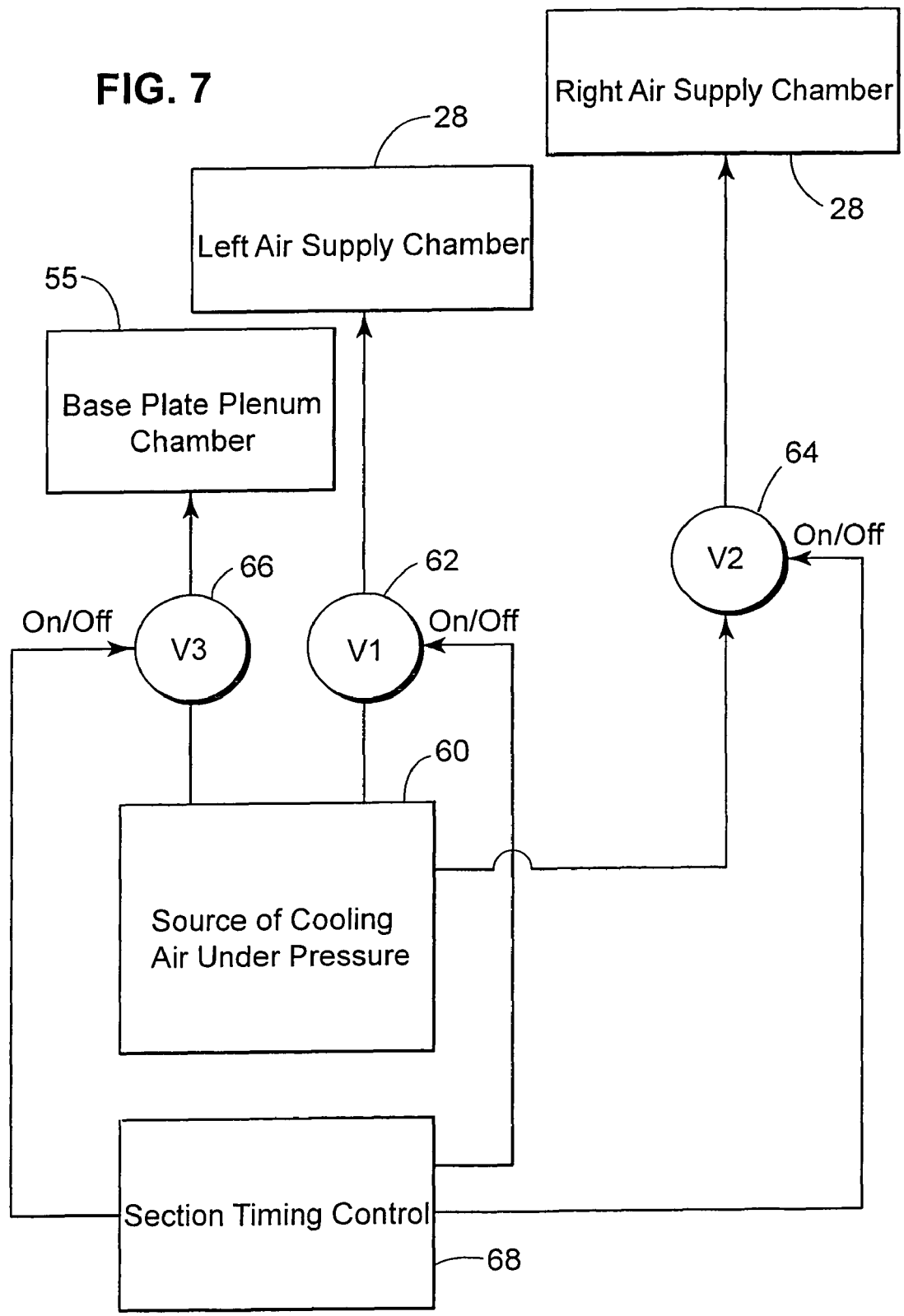
FIG. 7 shows a control system for the cooling system.

As shown in FIG. 7, a Source Of Cooling Air Under Pressure 60 can be supplied to the bottom plate(s) 55 via a third control valve V3/66, to the Left Air Supply Chamber/28 via the first control valve V1/62 and to the Right Air Supply Chamber/28 via a second control valve V2/64. The Section Timing Control 68 can turn each of these valves on and off during each section cycle.

When the machine according to the invention is in use, a cycle can be regarded as starting when the mold members are open as shown in FIG. 2. Preferably at this stage, the control cylinders V1, V2 will operate to provide cooling air to the chambers 28, and hence, to the recesses 16 of the four mold members. When cooling air enters the recess 16 of a mold member, it can pass either upwards through upper portions of the cooling passages 14 or downwards through lower portions of the cooling passages 14. When the mold members 2 are closed about a glass parison, the air supply to the chambers 28 can be stopped, and the third control valve V3 can be operated to supply cooling air to the outlets 54 in the plate 52 to pass up through the cooling passages 10, 14 and 17 of the mold members. When the mold members are opened, this supply of air to all the cooling passages will be turned off and air again can be supplied to the chambers 28 and thence to the recesses 16 and the cooling passages 14.

It has been found that the presence of the recess 16 interrupting the cooling passages 14 does not prevent the usual calculations of the cooling effect in an axially cooled system. Preferably, the extra cooling provided by the chambers 28 is provided for up to about 300 degrees in the cycle. The effect of the extra cooling on the vertical temperature profile in the mold members can be affected as desired by the precise height wise location of the recess 16 in the mold member.

The arrangement illustrated in fact allows for very flexible control of the cooling of the blow mold members 2. While axial cooling from the outlets 54 will take place when the mold is closed, air can be supplied to the recesses 16 of the mold members 2 continuously throughout the whole of the machine cycle if desired.

If it is desired, the cooling of the mold can be modified by plugging certain of the air passages. For example, if the vertical profile of the mold temperature is that the bottom of the mold is hotter than the top, more cooling may be achieved by blocking some of the passages 14 extending upwards from the recess 16 while leaving the portion of those passages extending downwards from the recess 16 clear. Thus, more cooling air will be directed downwards from the recess 16 than upwards.

Figure 4:
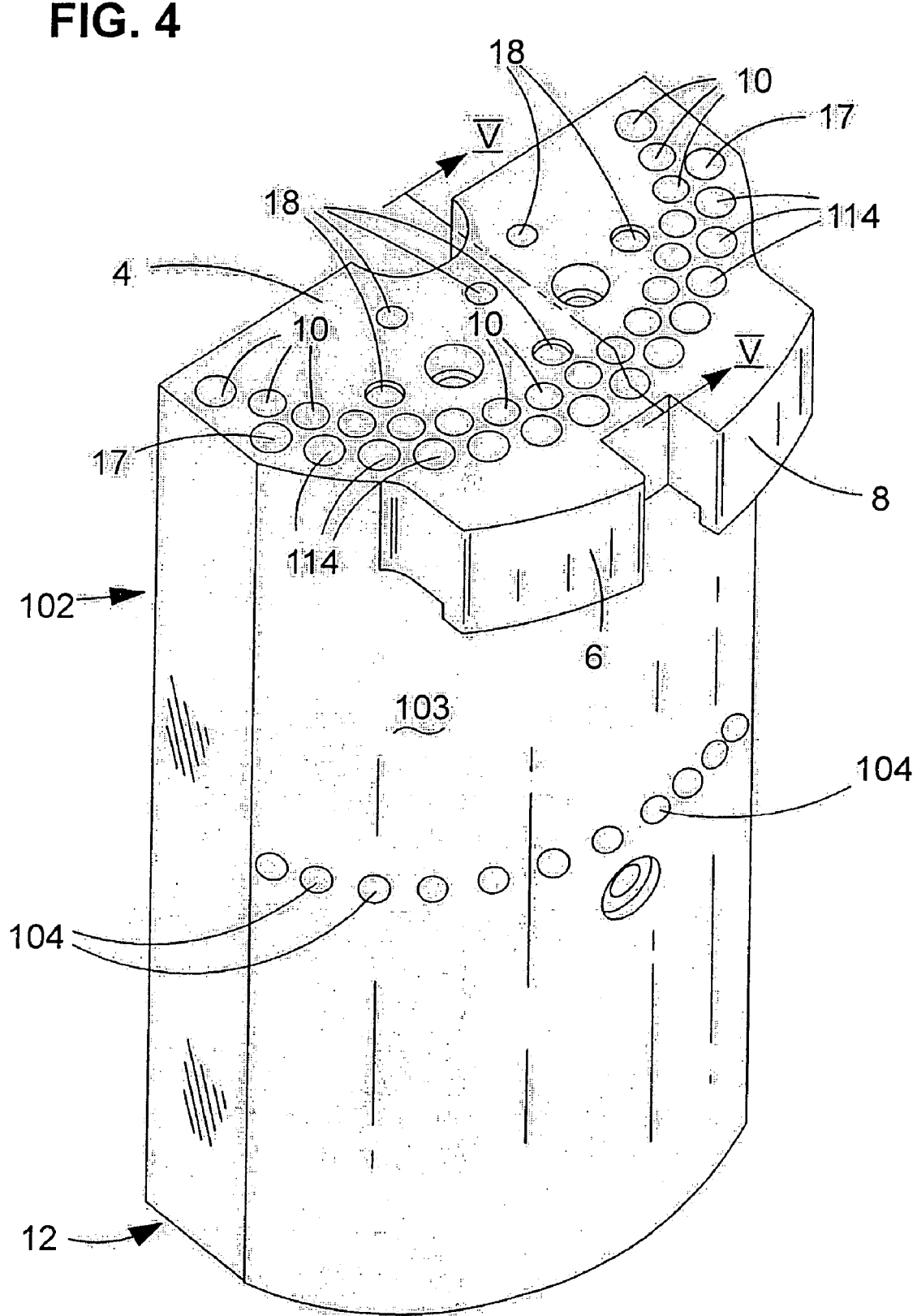
FIG. 4 shows a view, corresponding to FIG. 1, of an alternative mold member embodying the invention.
Figure 5:
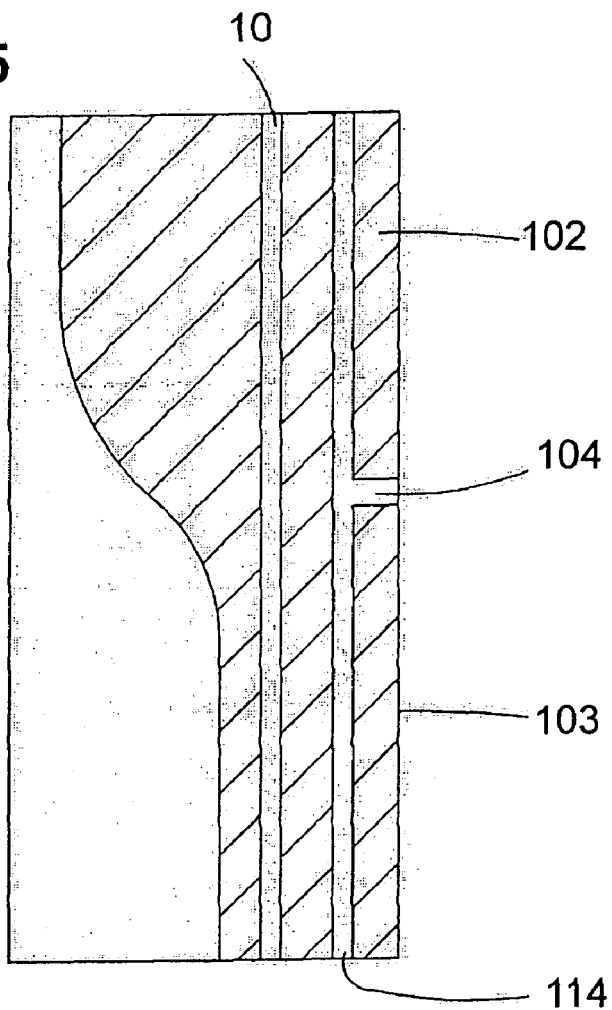
FIG. 5 shows a cross section along the line V-V of FIG. 4.

FIGS. 4 and 5 show an alternative mold member 102 which may be utilized in the mold mechanism of FIG. 2 in place of the mold members 2. It will be understood that certain of the parts of the mold member 102 are indicated by the same numerals as in the mold member 2 of FIG. 1 where such parts are identical. The mold member 102 differs from the mold member 2 in that, instead of the recess 16, the mold member 102 comprises a series of generally radial passages 104 which extend from an outer surface 103 of the mold member to longitudinally extending cooling passages 114, corresponding to the passages 14 of FIG. 1. These passages 104 serve as additional means for introducing air into selected cooling passages 114 in the outer array of cooling passages intermediate the ends of those cooling passages. FIG. 5 shows a cross section of the mold member 102 showing that the passages 104 lie in a plane and all extend at right angles to the cooling passages 114.

Figure 6:
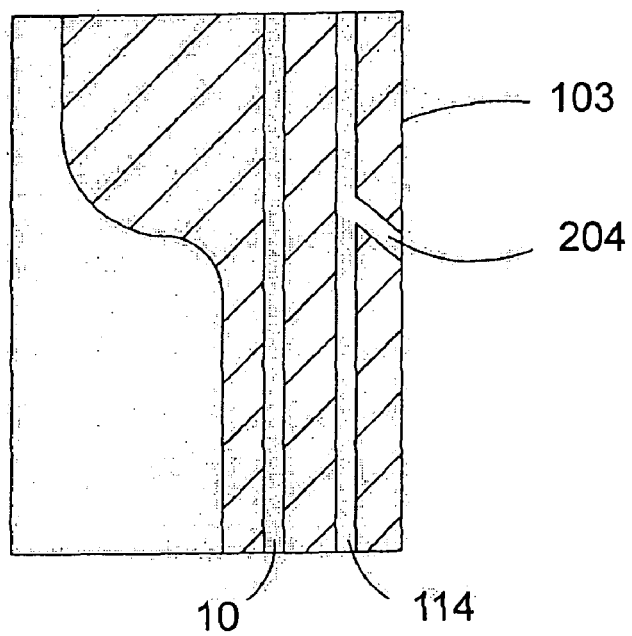
FIG. 6 shows a cross section, corresponding to FIG. 5, of a modified alternative mold member.

In FIG. 6, is shown a further modification of the alternative mold member of FIGS. 4 and 5. As can be seen, in this modification cooling passages 204 extend from the outer surface 103 of the mold member 103 to the longitudinally extending cooling passages 114, but instead of lying in a plane, as do the passages 104, the passages 204 are inclined to the axes of the cooling passages.

The construction of the mold members 102 allows for flexible control of the cooling of the blow mold members. Not only do the possibilities of varying the time during the machine cycle for which the additional cooling air is provided, as discussed above in relation to FIGS. 1, 2 and 3, still exist, but also the angling and positioning of the passages 104 or 204 allow for localizing the cooling in the mold member, thus allowing for example, for the reduction of hot spots in the mold member when in use.

The invention claimed is:

1. An I.S. glass bottle making machine comprising
a blow station including a blow mold having a pair of opposed mold halves each having an engagement surface, an outer surface, and top and bottom surfaces,
said mold halves moveable in a machine cycle between a closed position, in which the engagement surfaces engage to provide a mold cavity in which a parison can be blown into a bottle, and an open position,
a vertical array of cooling passages in each of said mold halves, said cooling passages having a top end at the top surface of the mold and a bottom end at the bottom surface of the mold,
aperture means defined in the outer surface of each of said mold halves, said aperture means communicating with said vertical array of cooling passages at an intermediate location between said top end and bottom end of the cooling passages,
means for supplying cooling air to a selected end of said array of cooling passages when said mold halves are at the closed position, and
means for supplying cooling air to said aperture means when the mold is located at any location between the mold closed position and the mold open position.

2. An I.S. glass bottle making machine according to claim 1, wherein said intermediate location is about midway between the top and bottom surfaces.

3. An I.S. glass bottle making machine according to claim 1, wherein said means for supplying cooling air to said aperture means of a mold half comprises
a mold arm adapted to support one of said mold halves,
said mold arm movable between mold open and mold closed positions,
said mold arm including an air chamber having outlet means communicating with the aperture means on a supported mold half,
air supply means, including a controllable valve for supplying air to said air chamber, and
control means for operating said controllable valve.

4. An I.S. machine according to claim 3, wherein said aperture means is a continuous horizontally extending recess in the circular surface of the mold half including about one half of the width of each passage in the vertical array of cooling passages.

5. An I.S. machine according to claim 3, wherein said aperture means comprises a hole communicating with each of said group of cooling passages.

6. A system for cooling a blow mold in an I.S. glass bottle making machine, the blow mold including two mold halves and the bottle making machine including a mechanism for manipulating the blow mold, the system comprising:
a vertical array of cooling passages defined in each mold half, the cooling passages having a top end at a top surface of each mold half and a bottom end at a bottom surface of each mold half;
each mold half defines an aperture, with the aperture in fluid communication with at least one of the vertical cooling passages at an intermediate location between the top end and bottom end of the cooling passages;

an air chamber configured to couple with the aperture and selectively provide air to the cooling passages; and an air supply source coupled to the air chamber.

7. The system of claim 6, wherein the aperture extends horizontally, circumferentially round the mold half and extends to at least half of the width of at least fifty percent of the array of cooling passages.

8. The system of claim 6, wherein the aperture is configured to extend from the outer surface of the mold half to at least one of the cooling passages in a plane horizontal to the cooling passages.

9. The system of claim 6, wherein the aperture is configured to extend from the outer surface of the mold half to at least one of the cooling passages in a plane inclined to the axes of the cooling passages.

10. The system of claim 6, including another array of vertical cooling passages defined in the mold half between a mold recess and the other array of vertical cooling passages.

11. The system of claim 6, including a control cylinder coupled to the air supply source and the air chamber of each mold half.

12. The system of claim 6, including a base plate configured to couple with each mold half, with the base plate defining a plurality of outlets configured for fluid communication with the vertical array of cooling passages in each mold half, with the base plate coupled to a third control cylinder and the air supply source.

13. The system of claim 12, wherein the two control cylinders coupled to the two mold halves and the third control cylinder are coupled to a section timing control wherein the ON/OFF timing of each cylinder is selectively controlled.

* * * * *